Dec. 31, 1940.    J. A. COY    2,227,297

AUTOMATIC LINE SHUT-OFF

Filed Jan. 27, 1939

Joseph A. Coy
INVENTOR

ATTORNEY

Patented Dec. 31, 1940

2,227,297

UNITED STATES PATENT OFFICE 2,227,297

AUTOMATIC LINE SHUT-OFF

Joseph A. Coy, Tulsa, Okla.

Application January 27, 1939, Serial No. 253,197

3 Claims. (Cl. 137—153)

The invention relates to a pressure controlled automatic line cut off, and has for its object to provide a device of this character whereby a predetermined pressure flow is allowed to pass through the line under normal conditions, and the device closed upon loss of pressure on the down stream side thereof, upon breakage of the line between the control device and the point of delivery.

A further object is to provide an automatic cutoff, pressure controlled, and particularly adapted to be positioned in a line leading from a Christmas tree of an oil well, and discharging into a separator or gasoline plant, and so constructed that it is maintained open by pressure from the line on the upstream side thereof and provided with means whereby it will close and stop the flow upon loss of pressure on the down stream side of the device.

A further object is to provide the device with a cylinder having a piston slidably mounted therein and controlling a valve cooperating with a valve seat in the line, a feed line from the up stream side and discharging into the cylinder above and below the piston for equalizing the pressure on the opposite sides of the piston and allowing an adjustable spring to overbalance the pressure within the cylinder and maintain the valve open. Also to provide a feed line from the upper end of the cylinder to the down stream side of the line, which when opened allows pressure from the down stream side of the line to enter the cylinder above the piston upon closing of the first mentioned feed line to the upper end of the cylinder. The downstream feed line forms means whereby the valve will be closed upon loss of pressure on the down stream side of the device in case of breakage.

A further object is to provide means whereby the tension of the spring can be varied for varying the pressure differential between the upstream and down-stream sides of the device.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
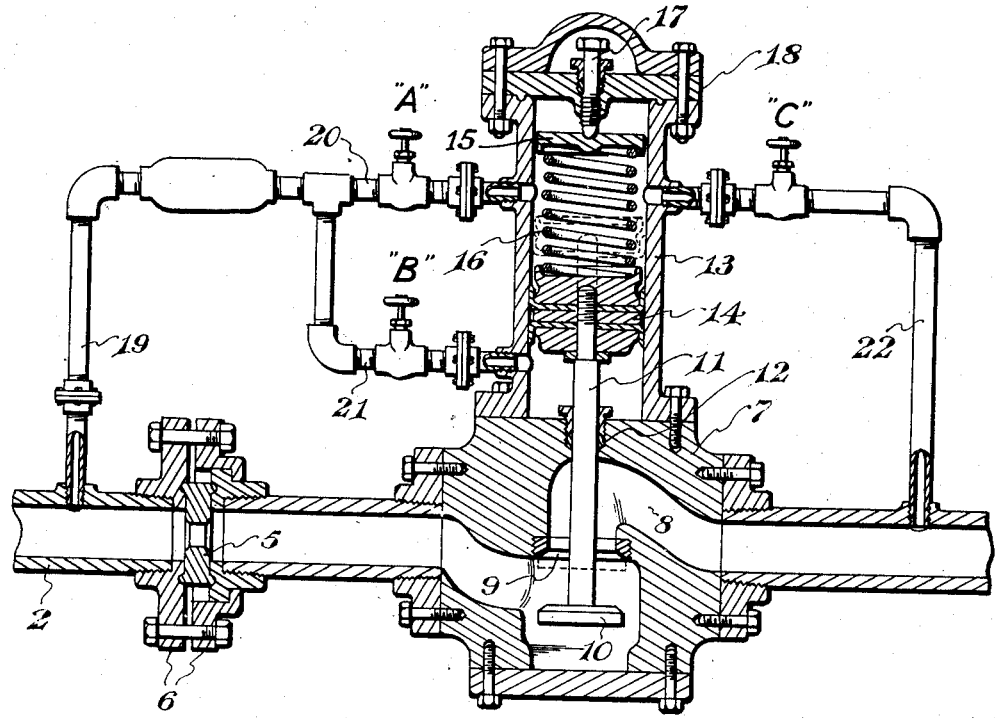
Figure 1 is a vertical longitudinal sectional view through the automatic line cut off.
Figure 2:
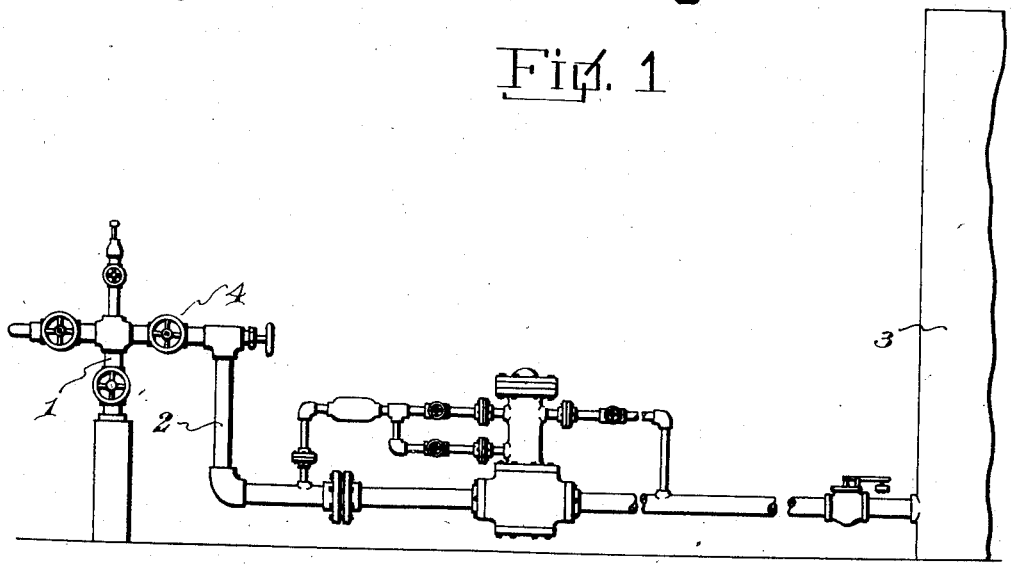
Figure 2 is a side elevation of the device showing the same applied to a line leading from a Christmas tree of an oil well to a separator or gasoline tank, which is usually remotely located in relation to the oil well.

Referring to the drawing, the numeral 1 designates a conventional form of Christmas tree used in connection with oil wells for connecting various pipe lines, and 2 one of said pipe lines which leads to a separator or gasoline plant 3, remotely located in relation to the well. The automatic cut off device hereinafter described is preferably positioned adjacent the well, and the control valves 4 carried by the Christmas tree, hence there is no necessity for an automatic control of the device upon breakage of the line between the device and the well, as it will only be necessary for the operator to cut off the flow by closing the valves 4 on the Christmas tree, however the automatic cut off is particularly designed to operate upon loss of pressure on the down stream side thereof where there is a long flight of pipe to the point of discharge and upon breakage of said pipe.

The discharge line 2 is provided with an orifice choke 5 on the upstream side of the device, and which choke is held in place by means of a union 6. The automatic cut off comprises a body 7 having a port 8 extending therethrough and a valve seat 9 with which the disc valve 10 cooperates for cutting off the flow through the line. Disc valve 10 is provided with a rod 11 which extends upwardly through the valve seat and is slidably mounted in a packing gland 12. Secured to the upper side of the valve casing 7 is a cylinder 13, in which is slidably mounted a piston 14, carried by the upper end of the connecting rod 11. Interposed between the upper side of the piston 14 and a disc 15 is an expansion spring 16, the purpose of which will presently appear. The expansive power of the spring 16 may be adjusted or varied by means of the adjusting screw 17 carried by the head 18 of the cylinder 13.

Connected into the line 2 on the well side of the choke 5 is a feed line 19, which terminates in branches 20 and 21, and discharge into the cylinder 13 above and below the piston 14. Branches 20 and 21 are provided with valves A and B for controlling the flow therethrough. It will be noted that when the valves A and B are opened and valve C closed that the pressure from the upstream side will enter the cylinder 13 above and below the piston 14, and this pressure will be equal on both sides of the piston. As the spring 16 exerts a downward pressure on the piston, the valve 10 will be maintained open. When the pressure in the line builds up, the valve A is closed, and the valve C opened, thereby allowing the pressure from the down-stream side to pass through the feed line 22 into the upper end of the cylinder above the piston 14 and maintain the valve 10 open. Upon breakage of the line on the down stream side there is a loss of pressure from the upper end of the cylinder above the piston through the line 22 and the pressure through the branch pipe 21 on the upstream side will overcome the spring pressure and force the piston 14 upwardly and close the valve 10.

After repairs have been made to the line the Christmas tree valves 4 are closed as well as the valve C, and both valves A and B are opened. When the pressure builds up and equalizes above and below the piston 14, the additional spring pressure above the piston will cause the disc valve 10 to be moved to open position, after which the valve A is closed, and the valve C opened for allowing the pressure from the down stream side, in combination with the spring action, to maintain the disc valve open for the further operation of the device.

As an example of operation, assuming the well pressure is three thousand pounds, and the down stream pressure has a differential of ninety-nine pounds, while the spring pressure is one hundred pounds. It will be seen there are three thousand pounds pushing upwardly on the under side of the piston from the high side through the feed line 19 and branch 21, and two thousand nine hundred and one pounds on the top of the piston pushing downwardly from the lower pressure side through the feed line 22 on the top of the piston, together with the one hundred pound force of the spring, hence there is a total of three thousand and one pounds downward pressure, which will hold the unit open along with the weight of the piston 14, its connecting rod 11 and disc valve 10. So long as this differential is maintained, the units will remain open, but should a break occur on the down-stream side which would disturb the ratio of differential the resistance on top of the piston would become weakened, and the pressure underneath the piston, from the feed line 19, would overcome the lowered pressure above the piston together with the spring action, and the piston would be forced upwardly and the valve 10 closed against the seat 9.

After the break is repaired there would be no pressure in the line below the unit. To again open the unit for use it would be necessary to shut the valve 4 on the Christmas tree and open the valve A, and after a short while the pressure all through the unit, down to the delivery point, would become equal, at which time the unit would open by force of the spring only, as all other pressures would be the same and therefore neutral. The device is now in condition to start operation as in the beginning. To do this the first operation is to close the valve C and open the valves on the Christmas tree which allows pressure to enter the line, after a few minutes the line becomes full and the normal differential pressures exist throughout the system.

During the above period the high pressure above and below the piston have held the valve open. The next operation is to close the valve A and open the valve C, so the device will again automatically operate in case of a break. The valve C is provided primarily so the upper part of the cylinder will not be bled of pressure from the feed line 20 when the valve A is open, during the initial operation. Valve A is manipulated for the mechanical setting of the device, so the valve 10 will be opened. After the valve A is closed, the valve C is opened, so the device will automatically operate by loss of pressure on the down-stream side for closing off the flow.

The invention having been set forth, what is claimed as new and useful is:

1. The combination with a pressure pipe line, and a pressure reduction choke in said line, of an automatic cut off device therefor on the down stream side of said choke, said device comprising a valve cooperating with a valve seat in the line between the high pressure side of the line and the lower pressure side on the down stream side of the choke, a pressure cylinder, a rod carried by the valve and extending into the pressure cylinder, a piston within the pressure cylinder, a feed line connecting the high pressure side of the pressure line on the up stream side of the choke with the cylinder above and below the piston and forming means for equalizing the pressure on both sides of the piston, an expansion spring within the cylinder above the piston and normally urging the piston downwardly and the valve to open position, a down stream feed line connecting the low pressure side with the cylinder above the piston and forming means for bleeding the cylinder above the piston upon a down stream breakage of the pressure line thereby allowing the up-stream feed line pressure beneath the piston to close the valve.

2. A device as set forth in claim 1 wherein the high pressure feed line terminates in branches connected to the cylinder above and below the piston, valves carried by said branches, a valve carried by the down stream feed line and adapted to be closed when both of the valves of the upstream feed line are open and to be opened when the up-stream feed line valve discharging into the cylinder above the piston is closed, thereby allowing the valve to be maintained open by the down stream pressure differential and the spring.

3. A device as set forth in claim 1 including valve means for cutting off the pressure from the upper end of the cylinder in the up-stream feed line and valve means in the down-stream feed line for preventing bleeding of the upper end of the cylinder during the pressure equalizing operation and when opened forming means for bleeding the upper end of the cylinder upon loss of pressure on the down stream side of the cut off.

JOSEPH A. COY.